Patented Oct. 12, 1943

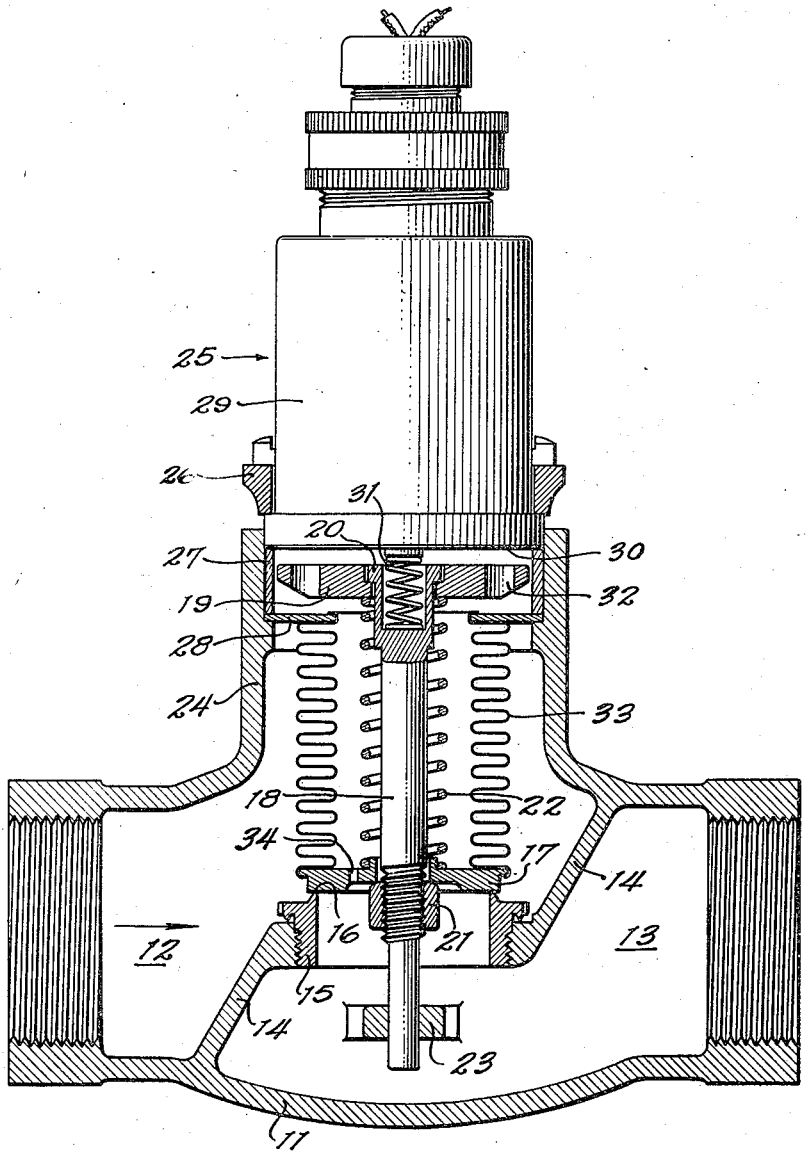

2,331,503

UNITED STATES PATENT OFFICE 2,331,503

FLUID CONTROL VALVE

William A. Ray, Los Angeles, Calif.

Application May 26, 1942, Serial No. 444,501

2 Claims. (Cl. 137—139)

My present invention relates to fluid control valves, and has for a general object the provision, in a valve having a reciprocable disk-like closure member, of means for rendering the closure member, when in closed position, unaffected by the pressure of the fluid controlled by the valve when that pressure is acting in its normal direction.

Another object is the provision of means, of the character described in the preceding object, whereby the closure member, when in closed position, is also rendered unaffected by fluid pressure acting in a direction opposite to normal, so that there is no tendency for the valve to be opened by such back-pressure.

Another object is the provision, in a valve of the character described, of an expansible-contractible bellows for screening the closure member from the pressure of the fluid in the inlet of the valve, which bellows is so constructed and arranged that the mean effective area of the bellows which is subjected to the fluid pressure is substantially equal to the area of the port opening defined by the seat of the valve.

Another object is the provision, in a valve of the character described in the preceding object, of electromagnetic means for actuating the closure member and which include means arranged to extend within the bellows.

Other objects and advantages of the invention will be found in the description, the drawing and the appended claims; and for complete understanding of the invention reference may be had to the following detailed description and accompanying drawing, the single figure of which is a view, mainly in longitudinal section, of a valve embodying my invention.

In the drawing, the numeral 11 indicates a valve casing having an inlet 12 and an outlet 13 separated by a partition 14. Threaded in an opening through a horizontal medial portion of the partition is a tubular valve port member 15, the upper or inlet surface of which is raised to form an annular valve seat 16. Cooperable with the seat 16 is a disk-like closure member 17 which is centrally apertured to freely receive a valve stem 18 which carries on its upper end a disk-shaped armature 19. The upper surface of the armature around the stem opening is recessed to loosely receive the enlarged upper extremity 20 of the stem so that the armature is restrained from upward movement with respect to the stem but is free to rock slightly thereon in all directions. A nut 21 is threaded on the valve stem 18 below the closure member and serves to adjust the length of the upper portion of the stem and thereby the position of the armature with respect to the closure member, a relatively stiff compression spring 22 urging the armature and closure member apart and respectively into engagement with the stem portion 20 and nut 21. By this arrangement, the armature and closure member operate as a unit and proper seating of the closure member is ensured regardless of possible slight angular displacement of the stem. The reduced bottom end portion of the stem, below nut 21, is guided in an opening through a boss 23 which extends integrally from a side wall of the valve casing at the outlet thereof.

Mounted in a tubular upper extension 24 of the valve casing is an electromagnet, generally indicated at 25, which is clamped by a ring 26 in engagement with a sleeve 27 which in turn engages a shoulder formed by an inwardly projecting portion of the casing extension, a centrally-apertured disk 28 being marginally interposed between the sleeve and the shoulder. The electromagnet is of the type shown in my copending application, Serial No. 429,983, filed February 9, 1942, and comprises an inverted cup-shaped outer core 29 and a concentric inner core, a coil winding being in the annular space between the cores. The cores form pole faces in a plane parallel to and spaced but a short distance above the armature 19, a thin disk or diaphragm 30, of non-magnetic material, being provided immediately below the pole faces. This diaphragm serves both to seal the electromagnet from the fluid controlled by the valve, and also as means for ensuring against retention of the armature by the core, due to residual flux, when the electromagnet is deenergized. Within a recess formed in the upper end of the valve stem 18, and compressed between it and the electromagnet, is a spring 31 which serves to urge the armature out of engagement with the cores and the closure member 17 toward its seat. As was previously mentioned, the armature is permitted to rock slightly on the stem so that its top surface can accurately conform to the plane of the pole faces when it is attracted into engagement therewith. The armature is provided with a plurality of openings 32 which serve to prevent dash-pot action which otherwise might be caused by the proximity of the periphery of the armature to the sleeve 27, by which sleeve the armature is loosely guided.

Surrounding the stem 18, and sealingly secured, as by solder, at its opposite ends to the disk 28 and to the closure member 17, is an elongated expansible-contractible metallic bellows 33. The bellows is so constructed and arranged that its convolutions extend substantially equally on opposite sides of the working edge of the valve seat 16, the mean effective diameter of the bellows thus being substantially equal to the effective diameter of the seat. When the closure member is on its seat, the pressure of the fluid in the inlet of the valve casing thus acts on the bellows equally in both an upward and a downward direction, the closure member being held on its seat substantially solely by the force of spring 31, so that under different conditions of fluid pressure the valve can be opened by the expenditure of the same amount of energy in the electromagnet. This condition of balance can best be understood by assuming first that the "bellows" is without convolutions and therefore in the form of a hollow cylinder of the same diameter as the valve seat—obviously there would then be no tendency for the fluid pressure to effect movement of the cylinder in an axial direction, and that would also be true of the closure member if its diameter were the same as that of the cylinder. If now an inward and an outword fold is formed in the cylinder, the area of the top and bottom surfaces presented by these folds would be equal and the effect of the fluid pressure on these surfaces (tending to cause downward and upward movement) likewise equal. In connection with the foregoing explanation it has been assumed that the interior of the bellows is sealed and contains an elastic fluid such as air at atmospheric pressure. However, in the preferred embodiment of the invention, the closure member is provided with an opening 34 which connects the space within the bellows with the outlet of the valve. The same condition of fluid pressure balance of the closure member still exists when the pressure is acting in its normal direction, and, because of this opening, the closure member is also balanced against back-pressure, i. e., if while the closure member is on its seat the pressure of the fluid in the outlet becomes greater than that in the inlet, there is no tendency for the closure member to be forced open, since, due to the opening therethrough, the fluid pressure above and below it is the same.

While I have herein shown and described a specific embodiment of my invention, I wish it to be understood that modifications may be made without departing from the spirit of the invention and that I intend therefore to be limited only by the scope of the appended claims.

I claim as my invention:

1. In a fluid control valve: a casing having an inlet and an outlet, and a partition separating the same; said partition having a port opening therethrough, and an annular valve seat at its inlet side and surrounding said opening; a disk-like closure member movable along the axis of said seat into and out of engagement with the seat and biased to closed position; an elongated expansible-contractible bellows having a mean effective diameter throughout its length substantially equal to the effective diameter of said seat; a wall of said valve casing, facing a surface of the inlet side of said partition, having an aperture therethrough generally on the axis of said valve seat; said bellows being sealingly joined at one end to the closure member concentrically therewith, and at its other end to the casing so as to close said aperture; and means for actuating said closure member comprising a valve stem connected to the closure member and extending within the bellows substantially the full length thereof, said valve stem being yieldably connected to the closure member and having a portion extending therethrough and adapted to slide in an opening formed in a portion of an outlet wall of the casing, an armature mounted on the free end of said stem, and an electromagnet cooperable with said armature and mounted on the casing so as to cover said aperture.

2. In a fluid control valve: a casing having an inlet and an outlet, and a partition separating the same; said partition having a port opening therethrough, and an annular valve seat at its inlet side and surrounding said opening; a disk-like closure member movable along the axis of said seat into and out of engagement with the seat; an elongated expansible-contractible bellows having a mean effective diameter throughout its length substantially equal to the effective diameter of said seat; a wall of said casing, facing a surface of the inlet side of said partition, having an aperture therethrough generally on the axis of said valve seat; said bellows being sealingly joined at one end to the closure member concentrically therewith, and at its other end to the casing so as to close said aperture; and means for actuating said closure member comprising a valve stem connected to the closure member and extending within the bellows substantially the full length thereof, said valve stem being yieldably connected to the closure member and having a portion extending therethrough and adapted to slide in an opening formed in a portion of an outlet wall of the casing, and means for actuating said stem and mounted on the casing so as to cover said aperture.

WILLIAM A. RAY.